United States Patent
Morinigo et al.

[19]

[11] Patent Number: 6,157,175
[45] Date of Patent: Dec. 5, 2000

[54] MOBILE POWER GENERATION SYSTEM

[75] Inventors: Fernando Morinigo; Keith Stuart; Richard Ulinski, all of El Segundo, Calif.

[73] Assignee: Aura Systems, Inc., El Segundo, Calif.

[21] Appl. No.: 09/259,899

[22] Filed: Feb. 26, 1999

[51] Int. Cl.[7] .................................................. H02P 9/00
[52] U.S. Cl. ............................................. 322/28; 322/29
[58] Field of Search .................................. 322/14, 15, 28, 322/29; 323/283; 290/40 A, 40 F

[56] References Cited

U.S. PATENT DOCUMENTS

| | | | |
|---|---|---|---|
| 4,168,459 | 9/1979 | Roesel, Jr. | 322/29 |
| 4,651,081 | 3/1987 | Nishimura et al. | 320/64 |
| 5,390,068 | 2/1995 | Schultz et al. | 361/95 |
| 5,625,276 | 4/1997 | Scott et al. | 322/24 |
| 5,656,922 | 8/1997 | LaVelle et al. | 322/46 |
| 5,818,117 | 10/1998 | Voss et al. | 290/40 A |
| 5,903,082 | 5/1999 | Caamano | 310/254 |
| 5,929,619 | 7/1999 | Chin et al. | 323/283 |

*Primary Examiner*—Nick Ponomarenko
*Attorney, Agent, or Firm*—Blakely, Sokoloff, Taylor & Zafman LLP

[57] ABSTRACT

A power generator system, including an inductive generator for producing a generator electrical signal. The inductive generator contains electrically conductive stator field coil windings and an electrically conductive ferromagnetic disk-shaped rotor. The inductive generator is configured for under-the-hood installation and includes an input crankshaft for being externally driven by a motor vehicle engine. The generator is electrically coupled to an electronic control unit which responds to amplitude and frequency variation of the electrical signal, due to fluctuations in vehicle engine speed, and produces an output power signal having substantially constant voltage, substantially constant frequency, and at least one phase. The electronic control unit includes a three-phase vector controller for regulating the generator electrical signal which charges a DC voltage bus, a processor for monitoring the voltage level of the DC voltage bus, and an AC inverter which receives the DC voltage bus voltage, converts it into the output power signal and supplies the signal to an output connector in order to accommodate the connection of electrical devices to the system. If the vehicle engine speed is idle, the system implements a throttle control mechanism, coupled to the vehicle engine throttle, to adjust the engine speed in order to provide an adequate output power signal. The system also employs a safety shut-down subsystem for terminating operations of the generator in the event of a fault condition, such as, for example, generator overheating, generator current overload, and system overload.

26 Claims, 3 Drawing Sheets

MOBILE POWER GENERATION SYSTEM

BACKGROUND OF THE INVENTION

1. Field of the Invention

This invention generally relates to the field of electric power generation, and more particularly to a mobile, under-the-hood power generation system having a generator driven by a motor vehicle engine for producing substantial well-regulated electrical power.

2. Description of Related Art

The need for mobile commercial-grade AC power comes in many applications and cuts across many industries. There is an emerging need for a mobile power generation system that can satisfy the demands of power hungry machinery, like heavy construction tools, while still being capable of delivering well-regulated power to sensitive equipment, like computers. Moreover, not only should the mobile system have the capacity to generate such power while operating at a stationary site, it should also provide the same type of power while the system is in transit. For example, a mobile power generation system should be versatile enough to support the power requirements of emergency response vehicles rendering life-saving services while in transit, as well as satisfy the power demands of sensitive intelligence/news-gathering computer and telecommunications equipment in isolated regions of the world.

There exist various types of mobile power generation systems in the prior art. The most common prior art systems, capable of providing useful, appreciable power, are the portable self-contained generation units. Although these self-contained systems cannot generate power while in transit, they are mobile in the sense that they can be transported to a stationary site in need of electrical power. These self-contained systems usually provide from 2.5 to 10.0 kW of power and are primarily used as residential emergency back-up power systems, remote site primary power installations, building/construction temporary power, and emergency response systems.

These self-contained systems generally rely on a prime mover, such as a small gasoline engine (e.g., 2–20 hp), to supply the mechanical energy that is ultimately converted into electrical power. The small engine is coupled to the input shaft of the generator unit and the power regulation circuitry connects to the electrical generator unit to provide 120–240v, 60 Hz AC output power. Characteristically, the generator units in these conventional portable systems are synchronous AC alternators with rotors that rotate at a constant frequency within the stator windings. By maintaining a constant rotor frequency, the frequency of the alternator electrical output power also remains constant. The rotor frequency, and hence the speed of the gasoline engine, is selected to ensure that the frequency of the electrical output power remains reasonably constant at 60 cycles per second (Hz). This frequency complies with the standard household electrical frequency provided by electrical utilities. The horsepower rating of the gasoline engine must then be selected in a manner that maintains a constant RPM irrespective of the load placed on the engine by the generator unit. The load is determined by the present value of the electrical current being developed by the generator unit in response to varying power demands of devices being powered.

Other prior art mobile power generation systems include "under-the-hood" systems which typically operate in conjunction with a motor vehicle's alternator or battery to provide "on-the-fly" power while the vehicle is in transit. The quantity and quality of the output power generated by these systems are constrained by the limitations of the alternator and battery. For example, as of the filing date of this application, there are no known under-the-hood systems that generate a well-regulated output of 60 Hz–120VAC with a 5 kW power rating. Hence, conventional under-the-hood systems are unable to provide the kind of well-regulated, substantial power needed to service both sensitive and power hungry applications. For example. such systems are incapable of generating 120 VAC, 60 Hz, 5 kW power while a vehicle is in transit, irrespective of the vehicle's engine speed.

Another disadvantage and limitation of the conventional portable self-contained generation systems is that, because of the constant frequency requirement, the prime movers (e.g., gasoline engines) must always run at peak power RPMs even though the loads placed on such engines may be minimal or nonexistent. Moreover, the kilowatt equivalent of the rated gasoline engine horsepower must be substantially larger than the maximum kilowatt rating of the generation system in order to ensure that the load transient on the engine do not vary the engine RPM—a necessary component in maintaining a constant electrical output power frequency.

A further disadvantage and limitation of these conventional portable self-contained systems is that they are relatively bulky and heavy in overall size and weight. These physical factors make the handling and movement of such systems by a single person virtually impossible and renders the transport in passenger vehicles unmanageable. Even when separate trailer mounts or truck beds are used to accommodate the transport of such systems, their size and weight may still require many individuals to position the systems in place. Furthermore, even when systems can supply power while in transit, the power is either not of the same magnitude or not of the same conditioned quality as during stationary operations.

Yet another disadvantage of these conventional portable self-contained generation systems is that they contain a fuel reservoir for supplying fuel to the prime movers (e.g., gasoline engines). Clearly, these systems cannot be stored or transported in enclosed passenger vehicles unless alternative measures are taken to ensure the adequate ventilation of the system.

BRIEF SUMMARY OF THE INVENTION

Systems and methods consistent with the principles of the present invention address the need identified above by providing a mobile power generation system capable of generating substantial power yet adapted to easily mount within the engine compartment of a passenger vehicle.

It is an object of the present invention to overcome one or more disadvantages and limitations of the prior art portable power generation systems enumerated above.

It is a primary object of the present invention to provide a mobile power generation system, capable of providing well regulated electrical output power at a constant frequency such as, for example, 120 VAC, 60 Hz, 5 kW power, irrespective of the operational speed of the vehicle.

It is a further object of the present invention to provide a mobile power generation system that is readily transportable to any site accessible by a motor vehicle ad in any type of motor vehicle.

It is yet another object of the present invention to provide a mobile power generation system that is capable of being transported without depending o the physical strength of individuals.

It is yet another object of the present invention to provide a mobile power generation system that supplies ample, well-regulated power while in transit as well as during stationary operations.

It is still a further object of the present invention to provide a mobile power generation system that does not require a separate reservoir for storing fuel.

Systems and methods, consistent with the principles of the present invention as embodied and broadly described herein, include an electrical inductive generator for producing a generator electrical signal, the generator having an input crankshaft being externally driven by a motor vehicle engine. An electronic control unit responds to amplitude and/or frequency variations of the electrical signal and produces an output power signal having substantially constant voltage, substantially constant frequency, and at least one phase and supplies it to an electrical output connector to accommodate the connection of external electrical loads. The electronic control unit includes a three-phase vector control controller for regulating the generator electrical signal and for maintaining a DC voltage bus at a predetermined voltage level, a processor for monitoring the DC voltage bus voltage level, and an AC inverter for receiving the DC voltage bus voltage level and converting it to an AC output power signal.

The present invention also includes a generator speed sensor for supplying data representing the rotary speed of the electrical generator to the processor, wherein the vector controller adjusts the power of the generator electrical signal by calculating a slip frequency, based on the generator rotary speed provided by the processor, and by operating the generator above or below the calculated optimum slip frequency. In cases where the vehicle is idling at a constant speed, the processor, after detecting an electrical load at the AC inverter and receiving generator rotary data forms a command signal directing the throttle control actuator to maintain the generator speed substantially constant.

The present invention further includes a safety shut-down subsystem for terminating operations of the generator in the event of a fault condition. Fault conditions, include, but are not limited to, generator overheating, generator current overload, and system overload.

BRIEF DESCRIPTION OF THE DRAWINGS

The accompanying drawings, which are incorporated in and constitute a part of this Specification, illustrate a preferred embodiment of the invention and, together with the description, explain the objects, advantages, and principles of the invention. In the drawings.

DETAILED DESCRIPTION OF THE INVENTION

The following detailed description of the present invention refers to the accompanying drawings that illustrate preferred embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

Figure 1:
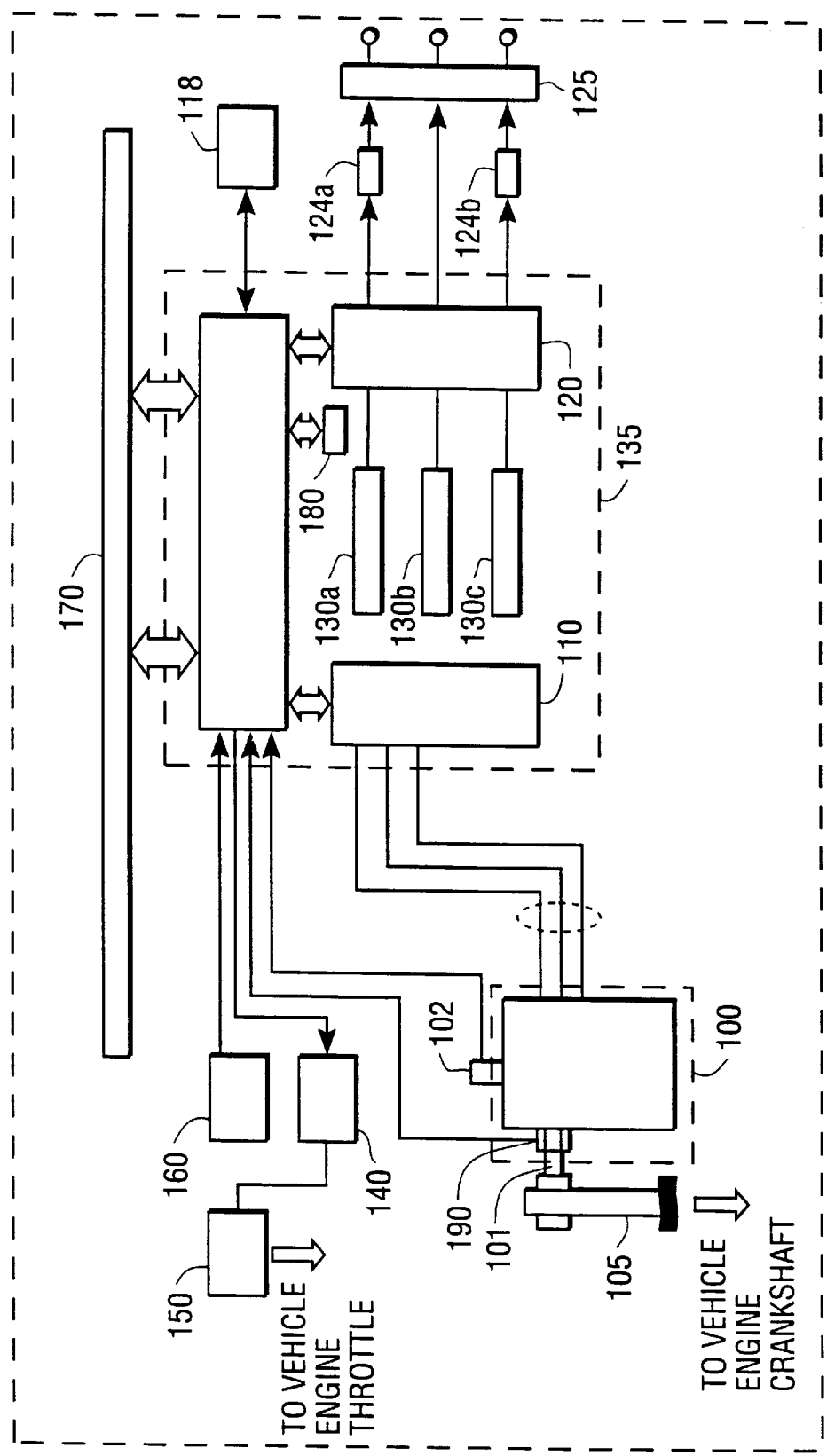
FIG. 1 is a block diagram depicting the main components constituting an embodiment of the present invention.

FIG. 1 illustrates a mobile power generation system 10 embodying the present invention. The system 10 includes an electronic control unit (ECU) 135 electrically connected to an electrical generator unit 100 and an electrical output connector 125.

Figure 2A:
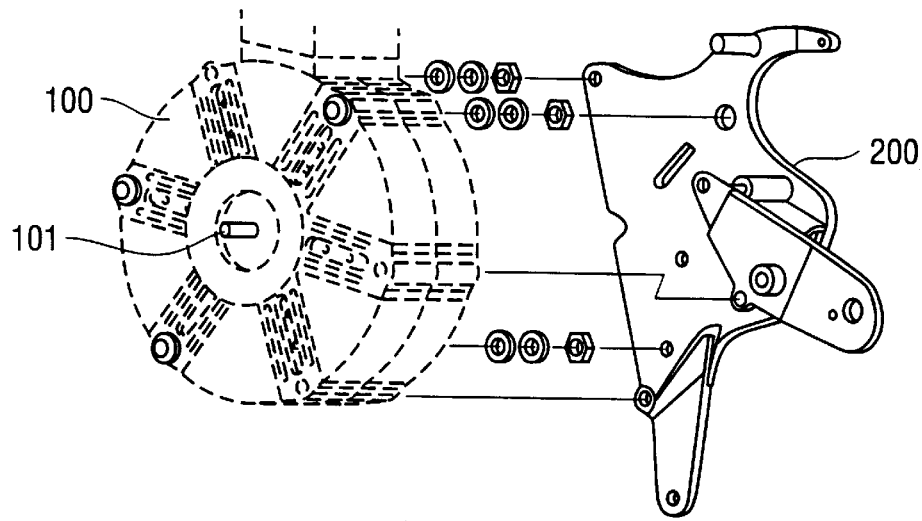
FIG. 2A illustrates the generator unit mounting bracket.
Figure 2B:
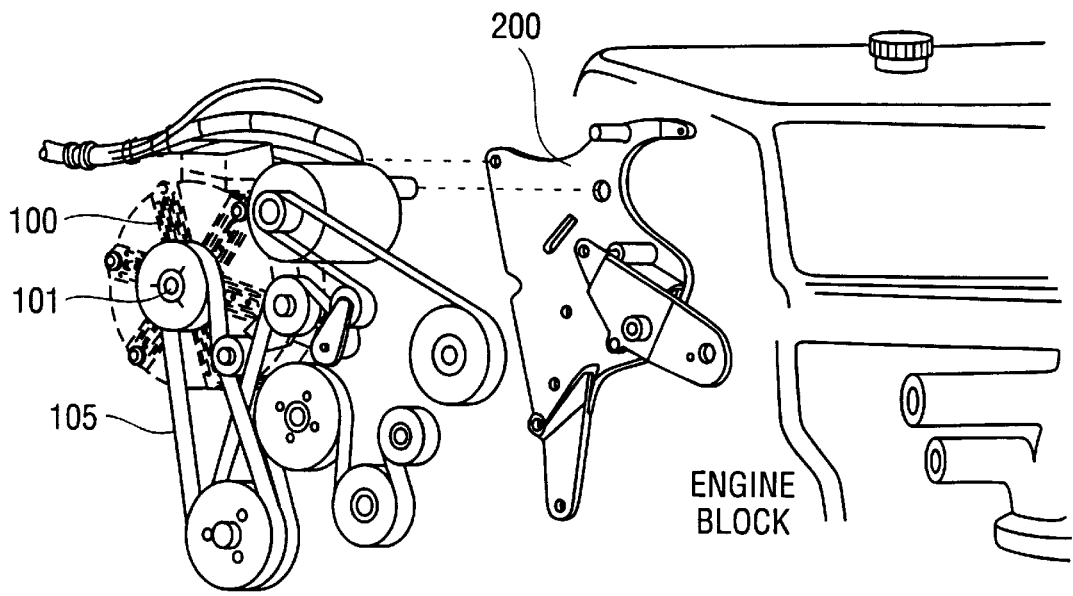
FIG. 2B illustrates a generator unit mounting option and belt-pulley assembly.
Figure 3A:
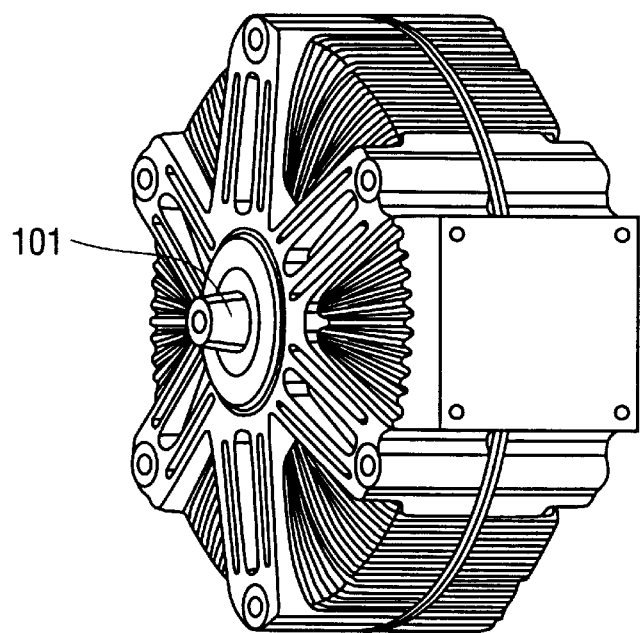
FIG. 3A is a side partial view of a preferred generator unit.

Generator unit 100 is an induction-type generator, requiring an external source of mechanical power to convert into electrical power. The generator unit 100 is coupled to a motor vehicle engine so that the required mechanical power is supplied by the rotational energy of the engine. The generator unit 100 is compact enough to easily fit inside the engine compartment of any vehicle and is adapted to mount onto motor vehicle engine in a manner similar to other engine-driven accessory devices. FIG. 2A depicts a mounting bracket 200 used to mount the generator unit 100 to the vehicle engine. The generator unit 100 also contains a crankshaft 101, protruding from the housing of the generator unit 100, which is coupled to the engine via a belt-pulley arrangement 105. FIG. 3A illustrates the input crankshaft 101 and FIG. 2B shows the generator unit 100 belt-pulley arrangement 105 engaging the engine. The belt-pulley assembly 105 may engage an accessory drive belt driven by the engine through another pre-existing pulley on the engine.

Figure 3B:
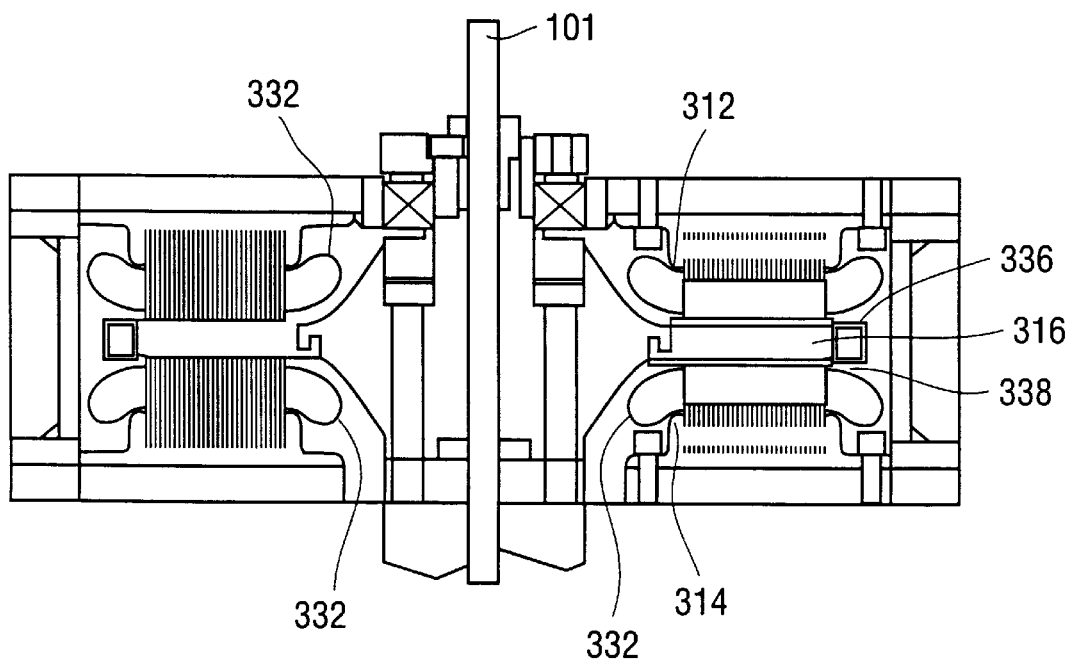
FIG. 3B is a side partial cross-sectional view illustrating the internal structure of a preferred generator unit.

In a preferred embodiment of the present invention, the generator unit 100 is an axial gap electrical induction generator of the type disclosed in U.S. Pat. No. 5,734,217, assigned to the assignee of the present invention, and which is herein incorporated by reference. The generator unit 100, as depicted in FIGS. 3A and 3B and as disclosed in the '217 patent, includes two stators 312 314 on both sides of a single rotor disk 316. The rotor disk 316 is constructed primarily of ferromagnetic material to greatly enhance the flux-carrying capacity and improve the electrical conductivity of the rotor disk 316. The stator field windings or coils 332 face each other and are sufficiently spaced away from the rotor to define an air gap 336, 228. The stators 312, 214 are mounted on housings that provide the structural support needed to withstand the high levels of internal magnetic loads created during normal operation. The rotor disk 316 is mounted onto the input crankshaft 101, held securely under both radial and axial loading and held precisely between the stators 312, 314 under all load conditions. As stated above, and shown in FIG. 3A, the end of the input crankshaft 101 extends out the front of the generator unit 100 to support a pulley of the belt-pulley assembly 105. By virtue of the features discussed above, the preferred generator unit 100 manifests enhanced flux-carrying capacities and improved electrical conductivity. As such, the preferred generator unit 100 is capable of highly efficient operation and achieves significantly greater torque forces that other comparably-sized generators.

In this type of preferred generator unit 100, three-phase AC voltages are applied to the stator field windings 332 to set up electric currents that create a series of magnetic poles which move in circular paths. This develops a magnetic flux wave, which extends across the air gap 336,228 and through the rotor disk 316. The frequency of the magnetic wave is the frequency of the applied voltages. The wavelength of the wave is geometrically fixed by the length of the circular paths and he number of poles pairs of the design of the stator field windings 332. When the rotor disk 316 spins at a speed faster than the wave, the drag torque draws mechanical or torational energy from the input crankshaft 101 and current in the coils 332 are forced into a backward flow in order to deliver electrical energy.

The intensity of this magnetic flux determines the amplitude of the current outputted by the generator 100 and is directly contingent on the speed of the engine. Thus, during vehicular travel, as the speed of the vehicle engine changes, the rotational velocity of the input crankshaft 101 commensurately changes. This varying velocity of the input crankshaft 101 causes the generator 100 to produce an amplitude- and frequency-variant electrical signal. The electronic control unit (ECU) 135 responds to the variant electrical signal and forms at least one AC single phase electrical output power signal having a substantially constant voltage and a fixed frequency. The output power signal is then supplied to the electrical output connector 125 for the connection of electrical devices or loads thereto. The electrical connector 125 may be configured as a connector for attaching additional power cables or as conventional wall outlets of the type specified by the National Electric Code and local building codes.

As illustrated in FIG. 1, the ECU includes a processor 115, programmable by an instruction set, a three-phase generator vector controller 110, a DC voltage bus 130, A neutral rail converter 131, and an AC inverter 120. The vector controller 110 is responsive to the amplitude- and frequency-variant signal produced by the generator unit 100 and acts to maintain the DC voltage bus 130 at a predetermined DC level. The DC voltage bus 130 applies the predetermined DC voltage to an AC inverter 120 in order to produce the AC output power signal. If it is desired to have DC voltage, the AC inverter 120 could be eliminated from the system. It is also possible to provide both AC and DC output power signals simultaneously.

The neutral rail converter 131 creates and maintains a voltage midway between the positive and negative rails of the DC voltage bus 130. Thus, 400 Volts DC is maintained as a positive 200 Volt bus 130a relative to the neutral rail converter 131 and a negative 200 Volt bus 130b relative to the neutral rail converter 131.

The AC inverter 120 produces the output power by converting the received DC voltage from the DC voltage bus 130 into an AC power signal. In a preferred embodiment of the present invention, the vector controller 110 maintains the DC voltage bus 130 at a nominal voltage of positive 200 VDC and negative 200 VDC with respect to the neutral rail 131. The positive DC bus 130a may be a plate of a capacitor or a respective plate of each one of several capacitors which are connected in parallel, with the other plate or plates coupled to the neutral rail 131. The negative DC bus 130b may also be a plate of a capacitor or a respective plate of each one of several capacitors which are connected in parallel, with the other plate or plates coupled to the neutral rail 131. The AC inverter 120 then converts the positive 200 VDC and negative 200 VDC into a plurality of AC output power signals, such as for example, two 120 VAC, 60 Hz signals, 180° out of phase. The voltage between the two signals is rated at 240 VAC while the voltage between each signal and a neutral rail 131 is 120 VAC. The neutral rail 131 allows the generation of a combination of 120 VAC and 240 VAC signals without requiring an output transformer.

The AC inverter 120 supplies the plurality of output AC power signals to the output connector 125. In an embodiment of the present invention, the electrical output connector 125 may include conventional 120 VAC and 240 VAC standard wall outlets. Additionally, each outlet of output connector 125 may be protected by an appropriately sized circuit breaker 124a, 124b. Selection of the circuit breakers 124a, 124b and of the gauge of associated wires interconnecting the AC inverter 120 and each outlet of output connector 125 is preferably made in accordance with standards as set forth in the National Electrical Code.

The system 10 is self-equilibrating, and thus conforms to the principle that the power produced by the system 10 must match the power being drawn from the system 10. To this end, the system 10 employs the vector controller 10 to regulate the power of the electrical signal produced by the generator unit 100. The system 10 monitors the voltage level of the DC voltage bus 130 and the vector controller 110, through power adjustments of generator 100 and maintains the DC voltage bus 130 at a predetermined voltage level (e.g., positive and negative 200 VDC). For example, as will be explained in greater detail below, when a load is applied to the system 10, the processor 115 senses a power sag and the vector controller 100 reacts by causing the generator 100 to produce enough power to compensate for the power drawn. When the applied load is disconnected from the system 10 or is turned off, the vector controller 110 responds by reducing the power produced by the generator 100.

The vector controller 110 adjusts the output power of the generator 100 by operating either above or below the optimum "slip" through modifying the applied AC voltage level to the generator stator coils 332. The "slip," expressed as a percentage, is defined as the slip frequency divided by electrical frequency applied to the stators 312, 314. The slip frequency is the difference between the mechanical frequency—a function of generator 100 speed—and the electrical frequency. By adjusting the electrical frequency, the slip can be adjusted thereby adjusting the magnitude of the currents in the rotor disk 316. The generator 100 speed is determined by a generator speed sensor 190 disposed near the belt-pulley arrangement 105, as shown in FIG. 1. The generator speed sensor 190 may be any type of sensor that determines RPMs, such as the vehicle's existing tachometer circuit, or hall effect sensor. After determining the speed of the generator 100 (i.e., RPMs), the sensor 190 supplies a speed information-bearing signal back to the processor 115. The processor 115 then feeds the speed information to the vector controller 110 which computes the optimum slip as a function of the generator unit 100 speed and the generator stator coil 332 current, and adjusts the generator 100 electrical signal power by commensurately operating the generator unit 100 above or below the optimum slip.

As stated above, the system 10 is self-equilibrating, and hence, monitors the DC voltage bus 130 voltage levels and adjusts the generator 100 electrical signal power to maintain the DC voltage bus 130 at a predetermined voltage level. The processor 115, by virtue of the vector controller 110, continuously monitors the voltage level of DC voltage bus 130. Upon detecting a drop in the voltage level greater than a tolerable threshold, the processor 115 measures, through the AC inverter 120, the load placed on the system 10 at output connector 125. The vector controller 110 then varies the current within the stator field coils 332 in order to adjust the generator 100 electrical signal power and ensure that sufficient power is outputted to maintain the DC voltage bus 130 at the predetermined voltage level.

For example, when an electrical load is applied to output connectors 125, power is drawn from the DC output power bus 130, causing the output power bus 130 voltage to drop, albeit temporarily, below its set levels of positive and negative 200 VDC. The processor 115, detecting the drop in the DC voltage bus 130 voltage and measuring the load, commands the vector controller 110 to increase the generator 100 electrical signal power in accordance with the load. The vector controller 110, responsive to commands from the processor 115, responds by varying the current within the stator field coils 332 of the generator unit 100 and/or adjusting the operating slip frequency to produce enough additional power in the generator 100 electrical signal to bring the DC voltage bus 130 back up to the set voltage level. Conversely, when the load is disconnected from the output connectors 125 or turned off, the DC voltage bus 130 level will rise above its set level and the vector controller 110 will react by modifying current within the stator field coils 332 to reduce the generator 100 electrical signal power production and bring the voltage back down. By incorporating processor 115, this is done extremely quickly and precisely and the tolerable voltage change threshold is kept so that under normal conditions, the voltage varies, at most, by approximately one volt around the set level, thereby preventing light bulb "flicker" results.

At initial start-up of the system 10, there exists no voltage on the DC voltage bus 130. Because generator 100 is an induction-type generator, as described above, and lacks self-excitation, the lack of DC voltage on bus 130 precludes the vector controller 110 from developing or applying any current for the generator stator field coils 332. As such, the system 10 may further include a battery 160, Preferably, the battery 160 is the existing 12 VDC motor vehicle battery, but may also be a dedicated stand-alone battery. One terminal of the battery 160 is electrically connected to the processor 115. Thus, shortly after initial start-up, the processor 115 switches voltage from the battery 160 to the vector controller 110. The vector controller 110 in turn develops, from the battery 160 voltage, a current for the generator 100 stator field coil windings, thereby enabling the initial charging of the capacitor(s) of the DC voltage bus 130. Once the voltage of the DC voltage bus 130 meets the predetermined threshold, the processor 115 may switch the battery 160 out of the system 10. Thereafter, the voltage of the DC voltage bus 130 is sufficient for the vector controller 110 to develop current for the generator stator field coils 332.

The system 10 may further include a user interface or control module 118. The module may include, for example, power meters, on-off/control switches, a heavy duty mode switch (i.e., for accommodating machinery that requires high start-up currents), an emergency/fault condition indicator, and other visual indicators, all of which are well known in the art.

One of the many virtues of system 10 is its ability to provide the same kind of conditioned electric power, regardless of whether the motor vehicle is in transit or stationary. For example, there are many applications in which the system 10 is capable of providing electrical power at a stationary location to a load external to the vehicle (e.g., providing temporary power at a construction site for heavy construction tools while the vehicle is parked). In such a case, the vehicle engine is operating at a single speed (i.e., idling) and, correspondingly, the generator input crankshaft 101 operates at a constant rotational speed. As stated above, the generator unit 100 converts external mechanical/rotational energy into electrical energy. Because mechanical power is equal to the torque times the engine speed (i.e., in RPMs), and the engine speed is constant, greater torque will be required from the vehicle engine when electrical power demands increase. Generally, torque fluctuations adversely affect engine speed, particularly gasoline-type engines which are susceptible to engine RPM slow-downs. This slow-down condition worsens because, as seen from the definition of mechanical power above, a slowing engine results in an increase in torque demand, which, in turn, exacerbates engine slow-down. As described below in greater detail, unless this progressive slow-down is compensated for, the system 10 will activate a low-RPM shut-down (i.e., see safety shut down subsystems).

The system 10 compensates for the engine slow-down by allowing the engine to consume more fuel in order to increase the mechanical Dower output of the engine. In addition, the generator 100 speed, as determined by generator speed sensor 190. must be increased as a function of electrical load to maintain peak efficiency. To this end, the vector controller 110 sends instantaneous power demands based on the electrical load to a throttle control 140, via the processor 115.

The throttle control operates to maintain the generator 100 speed by manipulating the vehicle engine throttle. An algorithm, coded into the processor 115, for throttle control 140 execution, relates the desired engine speed for the specific vehicle with the instantaneous power demand, establishing a throttle-commanded speed. The processor 115 compares the throttle-commanded speed with the actual generator 100 speed as provided by the generator speed sensor 190. If the actual generator 100 speed is less than the throttle-commanded speed, the processor 115 commands the throttle control 140 to direct a throttle positioner 150 to increase engine fuel consumption until the throttle-commanded speed and actual generator 100 speeds are equal. If the actual speed is greater than the throttle-commanded speed, throttle positioner 150 is directed to reduce engine fuel consumption until the speeds are equal. The throttle control device may be any conventional actuator commercially available for throttle positioning.

To safeguard against damage caused by anomalous occurrences or fault conditions, the system 10 may further include a safety shut-down subsystem 170. In the event of fault conditions, the safety shut-down subsystem 170 is designed to shut the system 10 down by terminating generator 100 operations and/or disengaging the throttle control 140 by mechanically disconnecting from the vehicle engine throttle.

The safety shut-down subsystem 170 guards against generator overheating and includes a generator coil temperature sensor 102, embedded in the generator stator coils 332, to monitor the temperature of the internal generator 100. As is well known, the temperature sensor 102 develops an electrical signal as a function of detected temperature. This electrical signal is then fed to the processor 115. If the generator 100 is operating under a high load and under high temperature conditions. the internal temperature of the generator 100 could rise above safe levels. If the internal temperature, as indicated by the temperature sensor 102 signal, exceeds a predetermined threshold, the processor 115 responds by commanding the vector controller 110 to disable any current to the stator field coil 332, effectively disabling the generator unit 100 and shutting-down the system 10.

The safety shut-down subsystem 170 also protects against system 10 overload through circuit breakers 124a, 124b. If a load is applied to the system 10 that demands more power than the system 10 is rated for, the AC inverter 120 output circuit current will exceed peak values. The processor 115 responds by commanding the vector controller 110 to disable any current to the stator field coil 332, shutting down the system 10.

The safety shut-down subsystem 170 additionally protects against generator 100 current overload. As stated above, the amount of current drawn from the generator 100 is a function of load and generator 100 speed. If, under high load demands and low generator RPMs (which could happen if the throttle control 140 cannot react quickly enough to large applied loads) the generator 100 current exceeds a predetermined level, the system 10 activates a low-RPM shut-down. The processor 115 responds by commanding the vector controller 110 to disable any current to the stator field coil 332, shutting down the system 10.

The safety shut-down subsystem 170 further protects against electronic control unit (ECU) 135 overheating. Similar to the protection against generator 100 overheating, the safety shut-down subsystem 170 includes an ECU 135 power-board temperature sensor 180 to monitor the temperature of the ECU 135. If the ECU 135 temperature, as indicated by the temperature sensor 180 signal, exceeds a predetermined threshold, the processor 115 responds by commanding the vector controller 110 to disable any current to the stator field coil 332, effectively disabling the generator unit 100 and shutting-down the system 10.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention.

What is claimed:

1. A mobile power generation system comprising:
   an inductive generating unit, having electrically conductive stator field coil windings and an electrically conductive ferromagnetic disk-shaped rotor, for producing a generator electrical signal, said inductive generating unit being externally driven by a motor vehicle engine and configured for installation within an engine compartment of a motor vehicle;
   an electronic control unit for responding to at least one of an amplitude variation and frequency variation of the generator electrical signal and for producing an output power signal, said output power signal having substantially constant voltage, substantially constant frequency, and at least one phase; and
   an electrical output connector for receiving said output power signal from said electronic control unit and for externally supplying said output power signal, said electrical output connector configured to accommodate the connection of external electrical loads to the system.

2. The mobile power generation system set forth in claim 1 in combination with a vehicle engine, wherein said system is coupled to, and driven by, said vehicle engine.

3. The mobile power generation system set forth in claim 2, wherein said electronic control unit includes,
   a three-phase vector controller, electrically coupled to said inductive generating unit, for regulating said generator electrical signal,
   a DC voltage bus, electrically coupled to said vector controller, wherein said vector controller responds to said generator electrical signal in order to maintain said DC voltage bus at a predetermined voltage level, and
   an AC inverter, electrically coupled to said DC voltage bus, wherein said voltage level of said DC voltage bus is received by said AC inverter and converted into said AC output power signal.

4. The mobile power generation system set forth in claim 3, wherein said electronic control unit further includes a processor, programmable by an instruction set and electrically coupled to both said vector controller and said AC inverter, for communicating with said vector controller and said AC inverter and for monitoring said voltage level of said DC voltage bus.

5. The mobile power generation system set forth in claim 4, wherein said processor executes commands to said vector controller, based on detecting an electrical load at said AC inverter, and said vector controller adjusts a power level of said generator electrical signal by applying current to said stator field coil winding in response to the executed commands.

6. The mobile power generation system set forth in claim 5, further including a generating unit speed sensor for determining a rotary speed of said inductive generating unit, wherein said processor executes commands to said vector controller, based on detecting an electrical load at said AC inverter, and said vector controller responds by adjusting a power level of said generator electrical signal by calculating an optimum slip frequency, based on said generating unit rotary speed, and operating said generating unit above or below said optimum slip frequency.

7. The mobile power generation system set forth in claim 6, further including a throttle control actuator for controlling said vehicle engine throttle, wherein said processor, in response to detecting an electrical load at said AC inverter and said generating unit rotary speed, forms a command signal directing said throttle control actuator to maintain said generating unit speed substantially constant.

8. The mobile power generation system set forth in claim 7, further including a battery to provide initial start-up current to said generating unit stator field coil windings.

9. The mobile power generation system set forth in claim 8, further including,
   a generating unit temperature sensor to protect against said generating unit exceeding a predetermined temperature threshold,
   a circuit breaker to protect against said output power signal exceeding a predetermined peak value threshold,
   an electronic control unit temperature sensor to protect against said electronic control unit exceeding predetermined temperature threshold,
   wherein said processor responds to an excess of thresholds by disabling said vector controller from forming and applying current to said stator field coil windings.

10. A mobile power generation system comprising:
    an inductive generating unit, having electrically conductive stator field coil windings and an electrically conductive ferromagnetic disk-shaped rotor, for producing a generator electrical signal, said inductive generating unit being externally driven by a motor vehicle engine and configured for installation within an engine compartment of a motor vehicle;
    an electronic control unit for responding to at least one of an amplitude variation and frequency variation of the generator electrical signal and for producing an output power signal, said output power signal having substantially constant voltage, substantially constant frequency, and at least one phase said electronic control unit including,
    a three-phase vector controller, electrically coupled to said inductive generating unit, for regulating said generator electrical signal,
    a DC voltage bus, electrically coupled to said vector controller, wherein said vector controller responds to said generator electrical signal in order to maintain said DC voltage bus at a predetermined DC voltage level,
    an AC inverter, electrically coupled to said DC voltage bus, wherein the voltage level of said DC voltage bus is received by said AC inverter and converted into said output power signal, and a processor, programmable by an instruction set and electrically coupled to both said vector controller and said AC inverter, for monitoring the voltage level of said DC voltage bus;

a generating unit speed sensor for determining a rotary speed of said generating unit; and an electrical output connector for receiving said output power signal from said electronic control unit, for externally supplying said output power signal, said electrical output connector configured to accommodate the connection of external electrical loads to said system.

11. The mobile power generation system set forth in claim 10 in combination with a vehicle engine, wherein said system is coupled to, and driven by, said vehicle engine.

12. The mobile power generation system set forth in claim 11, wherein said processor executes commands to said vector controller, based on detecting an electrical load at said AC inverter, and said vector controller responds by adjusting a power level of said generator electrical signal by calculating an optimum slip frequency, based on said generating unit speed, and by operating said generating unit above or below said optimum slip frequency.

13. The mobile power generation system set forth in claim 12, wherein said vector controller further adjusts a power level of said generator electrical signal by modifying said current applied to said stator field coil windings in response to the executed processor commands.

14. The mobile power generation system set forth in claim 13, further including a throttle control actuator wherein said processor, in response to detecting an electrical load at said AC inverter and said generating unit rotary speed, executes commands to said throttle control actuator to maintain said generating unit speed substantially constant.

15. The mobile power generation system set forth in claim 14, further including,
- a generating unit temperature sensor to protect against said generating unit exceeding a predetermined temperature threshold,
- a circuit breaker to protect against said output power signal exceeding a predetermined peak value threshold,
- an electronic control unit temperature sensor to protect against said electronic control unit exceeding predetermined temperature threshold, wherein said processor responds to an excess of thresholds by disabling said vector controller from forming and applying current to said stator field coil windings.

16. A mobile power generation system comprising:
generating means, having electrically conductive stator field coil windings and an electrically conductive ferromagnetic disk-shaped rotor, for producing a generator electrical signal, said generating means being externally driven by a motor vehicle engine and configured for installation within an engine compartment of a motor vehicle;

electronic control means, for responding to variations of said electrical signal and for producing an output power signal having substantially constant voltage, substantially constant frequency, and at least one phase;

output connecting means for receiving said output power signal from said electronic control means and for externally supplying said output power signal, said output connecting means configured to accommodate said connection of external electrical loads to said system.

17. The mobile power generation system set forth in claim 16 in combination with a vehicle engine, wherein said system is coupled to, and driven by said vehicle engine.

18. The mobile power generation system set forth in claim 17, wherein said electronic control means includes,
- a vector controller means, coupled to said generating means, for regulating said electrical signal,
- a DC voltage means, coupled to said vector controller means, wherein said vector controlling means responds to said electrical signal and maintains said DC voltage means at a predetermined voltage,
- an inverting means, coupled to said DC voltage means, wherein the predetermined voltage of said DC voltage means is received by said inverting means and converted into said output power signal, and
- a processing means, electrically coupled to said vector controlling means and said inverting means, for monitoring the voltage level of said DC voltage means.

19. The mobile generation system set forth in claim 18, further including a speed sensing means for determining a speed of said generating, wherein said processing means executes commands to said vector controlling means, based on detecting an electrical lad at said inverting means, and said vector controlling means responds by adjusting a power level of said electrical signal by calculating an optimum slip frequency based on said generating means speed, and by operating said generating means above or below said optimum slip frequency.

20. The mobile power generation system set forth in claim 19, wherein said vector controlling means further adjusts a power level of said electrical signal by modifying said current applied to field coil windings of said generating means in response to said executed processor commands.

21. The mobile power generation system set forth in claim 20, further including a throttle control means wherein said processing means, in response to detecting an electrical load at said inverting means and said generating means speed determined by said speed sensing means, executes commands to said throttle control means to maintain said generating means speed substantially constant.

22. The mobile power generation system set forth in claim 21, further including a battery to provide initial start-up current to said generating means.

23. The mobile power generation system set forth in claim 22, further including,
- a generator temperature sensing means to protect against said generating means exceeding a predetermined temperature threshold,
- a circuit breaking means to protect against said output power signal exceeding a predetermined peak value threshold,
- an electronic control temperature sensing means to protect against said electronic control means exceeding predetermined temperature threshold,
- wherein said processing means responds to an excess of thresholds by disabling said vector controlling means from forming and applying current to said generating means.

24. A method of generating electrical power from a mobile power generator system wherein the mobile system includes a generating unit that is externally driven by a motor vehicle engine and configured for installation within an engine compartment of a motor vehicle and contains electrically conductive stator field coil windings and an electrically conductive ferromagnetic disk-shaped rotor, an output connector, and an electronic control unit having a processing unit, a three-phase vector controller, a DC voltage bus, and an AC inverter, said method comprising the steps of:

producing an electrical signal from said generating unit;

applying said electrical signal to said three-phase vector controller monitoring a voltage level of said DC voltage bus;

regulating said electrical signal by responding to variations of said electrical signal;

maintaining said DC voltage bus at a predetermined voltage level by applying said regulated electrical signal to said DC voltage bus;

applying said DC bus voltage to said AC inverter;

converting said DC voltage bus into an output power signal, wherein said output power signal has substantially constant voltage, substantially constant frequency, and at least one phase; and applying said output power signal to said output connector to accommodate said connection of external electrical loads.

25. The method set forth in claim 24, wherein the regulating step includes the substeps of, determining a generating unit speed, applying the generating unit speed to said processing unit, detecting and measuring an electrical load at said AC inverter, and calculating an optimum slip frequency, based on the generator speed, and operating said generating nit above or below said optimum slip frequency based on said electrical load.

26. The method set forth in claim 25, wherein the regulating step further includes the substeps of, determining a throttle command speed based on said electrical load, comparing said throttle command speed with said generator speed, and adjusting a throttle positioner to consume more or less vehicle engine fuel, based on the comparison, in order to maintain said generating unit speed constant.

* * * * *